United States Patent [19]

Baron et al.

[11]  4,049,614

[45]  Sept. 20, 1977

[54] PIGMENTED POLYCARBONATES

[75] Inventors: Arthur L. Baron; John V. Bailey, both of New Martinsville, W. Va.

[73] Assignee: Mobay Chemical Corporation, Pittsburgh, Pa.

[21] Appl. No.: 734,949

[22] Filed: Oct. 22, 1976

Related U.S. Application Data

[63] Continuation of Ser. No. 623,694, Oct. 20, 1975, abandoned.

[51] Int. Cl.$^2$ ............................................. C08K 3/36
[52] U.S. Cl. ............................................. 260/37 PC
[58] Field of Search ................................... 260/37 PC

[56] References Cited

U.S. PATENT DOCUMENTS

| | | | |
|---|---|---|---|
| 3,360,498 | 12/1967 | Rawlings | 260/37 PC X |
| 3,437,631 | 4/1969 | Cleveland | 260/37 PC |
| 3,933,730 | 1/1976 | Hoogeboom | 260/37 PC |

Primary Examiner—Sandra M. Person
Attorney, Agent, or Firm—Gene Harsh; Lawrence S. Pope; Frederick H. Colen

[57]  ABSTRACT

Polycarbonates are pigmented with an opaque pigment such as $TiO_2$ and contain, intimately mixed therein, a silica at a level of 0.01 to 3% by weight. The silicas are those produced by the flame hydrolysis of $SiCl_4$ and have a particle size up to about 10 microns. The pigmented polycarbonates can be moulded to form articles having excellent surface appearance and are especially adapted for moulding polycarbonates in moulds having radical contours and fine interstices which constrict the flow path of the polycarbonate during moulding.

8 Claims, No Drawings

PIGMENTED POLYCARBONATES

This is a continuation of application Ser. No. 623,694 filed Oct. 20, 1975, and now abandoned.

BACKGROUND OF THE INVENTION

1. Field of the Invention

This invention relates to polycarbonate polymers and more particularly polycarbonates which are used to form moulded articles. 2. Description of the Prior Art Polycarbonates derived from reactions involving organic dihydroxy compounds and carbonic acid derivatives have found extensive commercial application because of their excellent physical properties. These thermoplastic polymers are particularly suited for the manufacture of moulded products where impact strength, rigidity, toughness and excellent electrical properties are required.

In many polycarbonate uses, an opaque moulding is required to provide aesthetic qualities to the moulded article and/or to provide protection from light to materials to be stored within containers moulded from polycarbonates. Because of high viscosity of the polycarbonate resins and pigmented polycarbonate resins a high degree of force is necessary to mould polycarbonate articles. The rheology of pigmented polycarbonates causes problems in moulding articles which have radical contours and fine interstices in the moulds used to form these articles which restrict the flow path of the thermoplastic resin.

In many instances pigmented polycarbonate articles, which have been made in moulds having such radical contours and fine interstices, exhibit a striation in surface appearance. This striation is not a discernible irregularity in the surface smoothness of the article, but an irregularity in color characterized by definite tonal differences having discrete boundaries on the polycarbonate surface. The striation substantially detracts from the appearance of the moulded polycarbonate article making pigmented polycarbonates somewhat undesirable for moulded articles having radical contours and fine interstices.

The exact mechanism which causes the striation is not known, but it is theorized to be caused by a melt fracture in the moulding which does not reknit.

In accordance with the present invention, a pigmented polycarbonate is provided which can be moulded into articles from moulds having radical contours and fine interstices with constricted flow paths, while producing a moulded article with excellent surface properties.

SUMMARY OF THE INVENTION

A polycarbonate moulded article is provided with excellent surface appearance which is comprised of a polycarbonate resin, sufficient pigment to opacify the moulded article and a silica. The silica used to improve the surface appearance, i.e. to provide homogeneity of color throughout the surface, has a particle size up to about 10 microns and more preferably between about 1 millimicron and 50 millicrons.

When used herein "polycarbonate resin" means the neat resin without additives; "polycarbonate" means both the formulated polycarbonate resin with pigments, dyes and other additives.

The polycarbonate resins useful in practice of the invention are produced by reacting di-(monohydroxyaryl)-alkanes or dihydroxybenzenes and substituted dihydroxybenzenes with derivatives of the carbonic acids such as carbonic acid diesters, phosgene, bis-chloro-carbonic acid esters of di-(monohydroxyaryl)-alkanes and the bis-chloro-carbonic acid esters of the dihydroxybenzenes and the substituted dihydroxybenzenes.

The two aryl residues of the di-(monohydroxyaryl)-alkanes applied according to the invention can be alike or different. The aryl residues can also carry substitutents which are not capable of reacting in the conversion into polycarbonates, such as halogen atoms or alkyl groups, for example, the methyl, ethyl, propyl or tert - butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2'-(4,4'-dihydroxy- diphenyl)-propane, 1,1-(4,4'-dihydroxy-diphenyl)- cyclohexane, 1,1-(4,4'-dihydroxy-3,3'-dimethyl-diphenyl) -cyclohexane, 1,1-(2,2'-dihydroxy-4,4'dimethyl-diphenyl) -butane, 2,2-(2,2'-dihydroxy-4,4'-di-tert.-butyl-diphenyl)- propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°–150° C), 3,3-(4,4'-dihydroxy-diphenyl)-pentane, 2,2- (4,4'-dihydroxy-diphenyl)-hexane, 3,3-(4,4'-dihydroxy-diphenyl)-hexane, 2,2-(4,4'-dihydroxy-diphenyl)-4-methyl- pentane, 2,2-(4,4'-dihydroxy-diphenyl)-heptane, 4,4- (4,4'-dihydroxy-diphenyl)-heptane (melting point 148°–149° C.) or 2,2-(4,4'-dihydroxy-diphenyl) tri-decane. Suitable di-(monohydroxyaryl)-alkanes, the two aryl residues of which are different are, for example 2,2-(4,4'-dihydroxy- 3'-methyl-diphenyl)-propane and 2,2-(4,4'-dihydroxy-3- methyl-3'-isopropyl-diphenyl)-butane. Suitable di-(monohydroxyaryl) -alkanes, the aryl residues of which carry halogen atoms are for instance 2,2-(3,5,3'5'-tetrachloro- 4,4'-dihydroxy-diphenyl)-propane, 2,2-(3,5,3'5'- tetrabromo-4,4'-dihydroxy-diphenyl)-propane, (3,3'- dichloro-4,4'-dihydroxy-diphenyl)-methane and 2,2'- dihydroxy-5,5'-difluoro-diphenyl-methane. Suitable di-(monohydroxyaryl)-alkanes, the alkyl residue of which, linking the two benzene rings, is substituted by an aryl residue are for instance (4,4'-dihydroxy-diphenyl)- phenyl-methane and 1,1-(4,4'-dihydroxy- diphenyl)- 1-phenyl-ethane.

Suitable dihydroxybenzenes and substituted dihydroxybenzenes are hydroquinone, resorcinol, pyrocatecol, methyl hydroquinone and the like. Other suitable dihydroxyaromatic compounds are 4,4'-dihydroxy- diphenylene, 2,2'-dihydroxy-diphenylene, dihydroxynapthalene, dihydroxyanthracene and compounds represented by the structural formula:

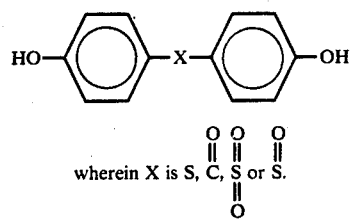

wherein X is S, C, S or S.

In order to obtain special properties, mixtures of various di-(monohydroxyaryl)-alkanes can also be used, thus mixed polycarbonate resins are obtained. By far the most useful polycarbonate resins are those based on 4,4'-dihydroxy-diaryl methanes and more particularly bisphenol A [2,2-(4,4'-dihydroxy-diphenyl)-propane]. Thus when flame retardant characteristics are to be imparted to the basic polycarbonate resin, a mixture of bisphenol A and tetrabromobisphenol A [2,2-(3,5,3'5'-tetrabromo- 4,4'dihydroxy-diphenyl) -propane] is utilized when reacting with phosgene or a like carbonic acid derivative.

The polycarbonates resins are prepared by methods known to those skilled in the art and more particularly by methods disclosed in U.S. Pat. No. 3,028,365 incorporated herein by reference.

The pigments used to opacify and color the polycarbonate are those conventionally known to skilled artisans for used in high molecular weight thermoplastic pigmentation. By far titanium dioxide is the most preferred pigment to opacify and whiten moulded articles because of its high index of refraction, extreme whiteness and brightness. However, other white pigments such as lithopone, zinc sulfide, zinc oxide, antimony trioxide, and the like may be used. To impart color (other than white) to the polycarbonate pigments such as red lead, cuprous oxide, cadmium reds, cinnabar, anitmony vermilion (red and brown pigments); zinc yellow, chrome yellows and oranges, cadmium yellow, antimony yellow, (orange and yellow pigments); chrome greens, chrome oxide greens (green pigments); cobalt blue, iron blues (blue pigments); lampblacks, vegetable blacks, animal blacks (black pigments) and the like.

In addition to the inorganic pigments, recited above, organic pigments may be used such as pigment chlorine, lithol fast yellow, toluidine red, permanent orange and the like. Dyes may be added impart color to the polycarbonate such as the phthalocyanines, the anthraquinones and the like.

This pigment is most frequently TiO₂ which is incorporated into the polycarbonate at a level of about 2 to 8 grams TiO₂ per pound of polycarbonate and more preferably 2 to 4 grams per pound of polycarbonate. The above ranges are sufficient to acceptably opacify the polycarbonate article.

The silica used in the practice of the invention provides the improved surface characteristics to the polycarbonate moulded article. The silica may have a particle size up to 10 microns and more preferably between about 1 and 50 millimicrons. Preferably the purity of the silica is 99.8% or greater as SiO₂ and is produced by the flame hydrolysis of SiCl₄. Surface areas of the silicas useful in the practice of the invention preferably range from 50 to 380 meter²/gram. The silica is incorporated into the polycarbonate at a range of 0.01 to 3% by weight and more preferably between 0.1 to 0.5% by weight based on the weight of the polycarbonate resin.

In the preparation of the polycarbonates of the invention, the polycarbonate resin in pellet or powdered form, is mixed in a tumble drum blender with the pigments and silica. The pigment/resin mix is then extrusion blended and subsequently moulded to form the final polycarbonate moulded article. In place of drum tumbling the pigment, silica and polycarbonate may be mixed by a high speed, high shear blender or other apparatus which provides intimate mixing of the powders.

Many alternative mixing procedures may be utilized for example, a masterbatch having a high concentration of pigment and silica can be made and subsequently let down with more polycarbonate resin. This procedure has the advantage of having a large amount of pigmented polycarbonate concentrated which can be added to polycarbonate resin to form many articles with minimal variation in color.

The invention will be further illustrated by the following examples.

EXAMPLE I

A polycarbonate resin having a melt flow of 6 to 12 grams/10 min. at 300° C. (ASTM D1238) and characterized by the repeating structural formula:

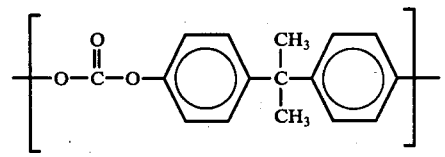

was pigmented with TiO₂ and a blue pigment blend to form a polycarbonate masterbatch. The formulation was as follows:

| Ingredient | Amount Grams/Pound For g/l Let Down Polycarbonate Powder |
|---|---|
| Blue Dye | 2.4 |
| Yellow Pigment | 0.1 |
| Green Pigment | 0.1 |
| Black Pigment | 0.09 |
| Titanium Dioxide | 30.0 |

The polycarbonate resin was in powdered form and was mixed with the colorant in a Welex® laboratory high speed mixer for two minutes.

The above masterbatches were extruded on a 1.5 inch Waldron Hartwig single screw extruder using a 3 to 1 compression screw and a 100 mesh screen. The extruded masterbatch was let down at a ratio of 9 parts polycarbonate powder to one part of extruded masterbatch by mixing in the Welex® mixer for 2 1/2 minutes at 1500 rpm.

The pigmented polycarbonate was injection moulded into discs having metal inserts therein to constrict the flow path of the polycarbonate. The resultant polycarbonate moulded article had striation on the surface thereof.

EXAMPLE II

Example I was repeated except the masterbatch was formulated to conatin 0.33% based on the weight of the polycarbonate resin, after let-down of fumed silica (produced by the flame hydrolysis of SiCl₄) having a surface area of 380 meter²/gram, and an average particle the size of one millimicron. No striation was present on the surface of the polycarbonate moulded article.

EXAMPLE III – VIII

Example I was repeated except that 22.7 grams/pound of polycarbonate of high density microcrystalline polyethylene was added to the masterbatch. Example III was a control having no silica therein with Examples IV through VIII having varying types and levels of silica. The formulations and moulding results of Examples III through VIII are reported on Table 1.

As is demonstrated by the above Examples, the silica containing polycarbonate molded articles demonstrate improved physical properties over the articles which do not contain silica.

The best properties are obtained from the fumed or activated silicas shown in Examples II, IV, V, and VI which are made by the flame hydrolysis of $SiCl_4$. Other silicas such as those shown in Examples VII and VIII improve the surface properties of the molded articles.

The foregoing examples illustrate specific materials used to prepare flame retardant compositions. However, the invention is not to be limited only as is set forth in the accompanying claims.

| Example | Percent Silica | Description Silica | Surface Appearance |
|---|---|---|---|
| III | None | — | Striated |
| IV | 0.1% | Particle size average 7 millimicron, 380m²/g surface area | Good, very slight striations |
| V | 0.3% | Particle size average 7 millimicron, 380m²/g surface area | Excellent |
| VI | 0.5% | Particle size average 7 millimicron, 380m²/g surface area | Excellent |
| VII | 0.3%[1] | Particle size 1 to 10 microns | Fair, slight striation |
| VIII | 0.5%[1] | Particle size 1 to 10 microns | Good |

[1]This silica is sold as Novacite and is not an activated silica.

What is claimed is:

1. A method for improving the surface properties of articles molded from a pigmented polycarbonate in molds having radical contours and fine interstices, the improvement comprising blending 0.01 to 3% by weight of silica having a particle size between about 1 and 50 millicrons into a polycarbonate resin containing sufficient pigment to opacify said polycarbonate resin when molded into an article.

2. The process of claim 1 wherein said polycarbonate resin is characterized by the repeating structural formula:

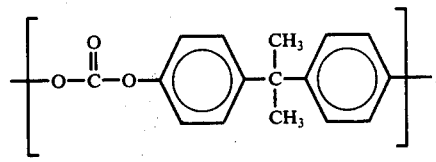

3. The process of claim 1 wherein said opacifying pigment is $TiO_2$.

4. The process of claim 3 wherein said $TiO_2$ is present at a level of 2 to 8 g/lb. of polycarbonate.

5. The process of claim 4 wherein said $TiO_2$ is present at a level of 3 g/lb. of polycarbonate.

6. THe process of claim 1 wherein said silica is present at a level of 0.1 to 0.5% by weight based on the weight of the polycarbonate resin.

7. The process of claim 1 wherein said silica is produced by the flame hydrolysis of $SiCl_4$.

8. A molded pigmented polycarbonate article produced by the process of claim 1.

* * * * *